(12) United States Patent
Geng et al.

(10) Patent No.: US 11,687,461 B1
(45) Date of Patent: Jun. 27, 2023

(54) PRIORITY-BASED CACHE-LINE FITTING IN COMPRESSED MEMORY SYSTEMS OF PROCESSOR-BASED SYSTEMS

(71) Applicant: QUALCOMM Incorporated, San Diego, CA (US)

(72) Inventors: Norris Geng, San Diego, CA (US); Richard Senior, San Diego, CA (US); Gurvinder Singh Chhabra, San Diego, CA (US); Kan Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/572,472

(22) Filed: Jan. 10, 2022

(51) Int. Cl.
*G06F 12/084* (2016.01)
*G06F 12/0811* (2016.01)
*G06F 3/06* (2006.01)

(52) U.S. Cl.
CPC .......... *G06F 12/084* (2013.01); *G06F 3/0608* (2013.01); *G06F 3/0659* (2013.01); *G06F 3/0679* (2013.01); *G06F 12/0811* (2013.01)

(58) Field of Classification Search
CPC .. G06F 12/0811; G06F 12/084; G06F 3/0659; G06F 3/0679; G06F 3/0608
USPC ........................................................ 711/118
See application file for complete search history.

(56) References Cited

U.S. PATENT DOCUMENTS

| 9,256,439 | B2 * | 2/2016 | Takahashi | G06F 9/345 |
| 10,169,246 | B2 | 1/2019 | Senior et al. | |
| 10,198,362 | B2 | 2/2019 | Senior et al. | |
| 2017/0286297 | A1 * | 10/2017 | Voigt | G06F 12/1009 |
| 2019/0326928 | A1 * | 10/2019 | Qu | H03M 7/6017 |

OTHER PUBLICATIONS

U.S. Appl. No. 17/572,471, filed Jan. 10, 2022.
U.S. Appl. No. 17/572,472, filed Jan. 10, 2022.

* cited by examiner

*Primary Examiner* — Hashem Farrokh
(74) *Attorney, Agent, or Firm* — W&T

(57) ABSTRACT

A compressed memory system includes a memory region that includes cache lines having priority levels. The compressed memory system also includes a compressed memory region that includes compressed cache lines. Each compressed cache line includes a first set of data bits configured to hold, in a first direction, either a portion of a first cache line or a portion of the first cache line after compression, the first cache line having a first priority level. Each compressed cache line also includes a second set of data bits configured to hold, in a second direction opposite to the first direction, either a portion of a second cache line or a portion of the second cache line after compression, the second cache line having a priority level lower than the first priority level. The first set of data bits includes a greater number of bits than the second set of data bits.

10 Claims, 11 Drawing Sheets

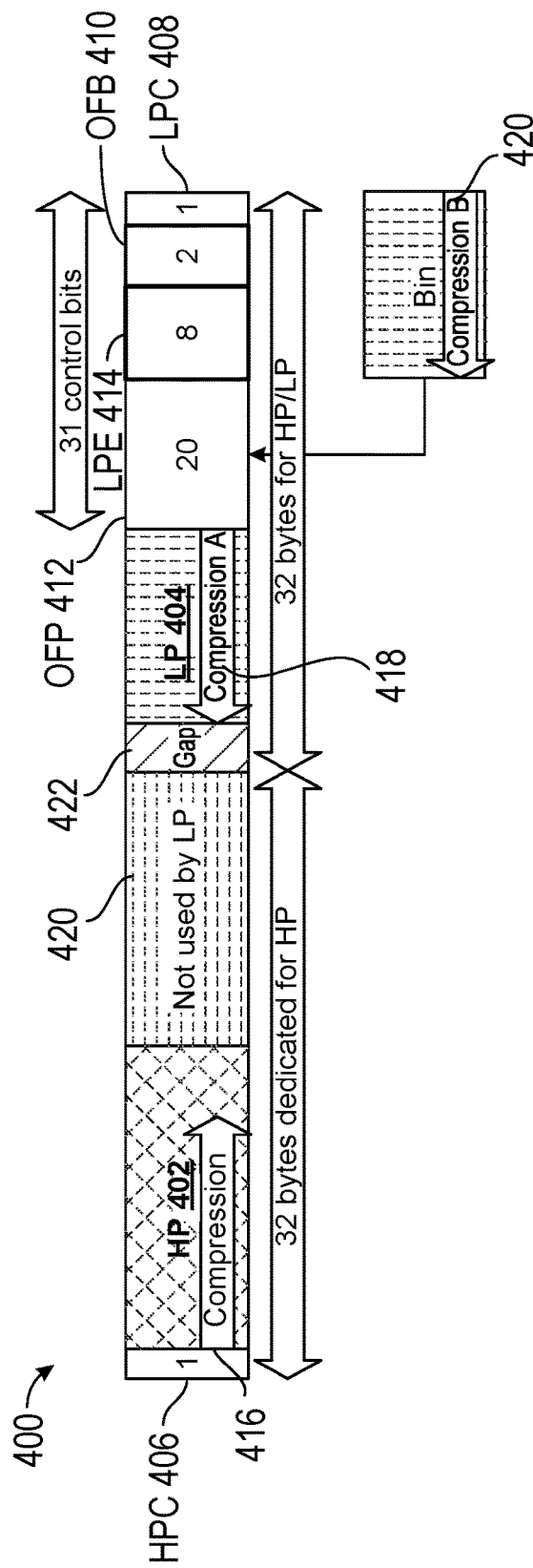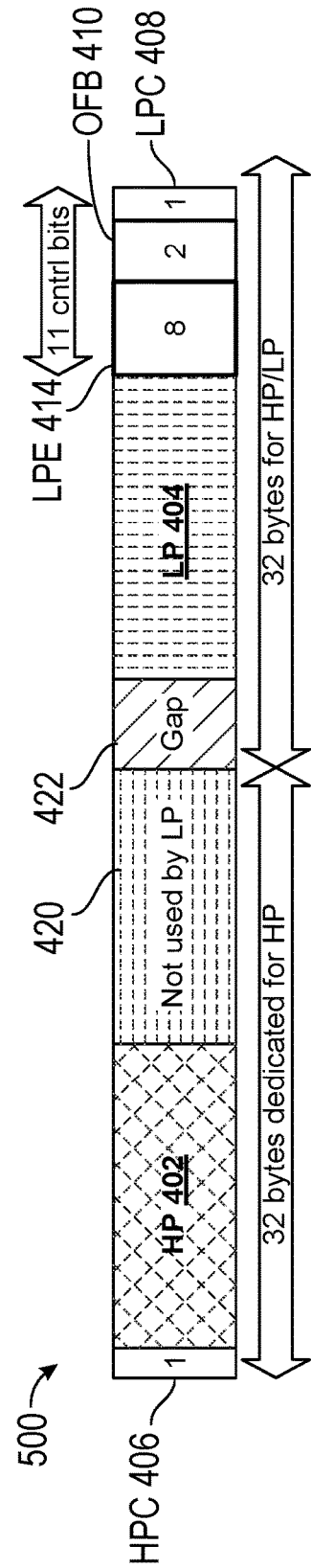
Figure 4
Figure 5

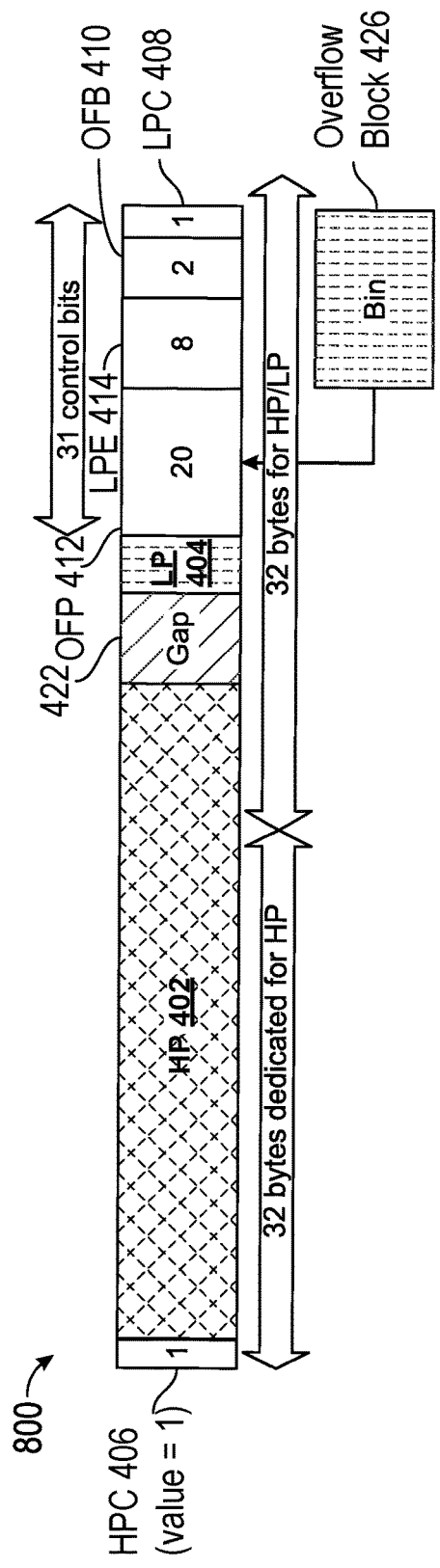
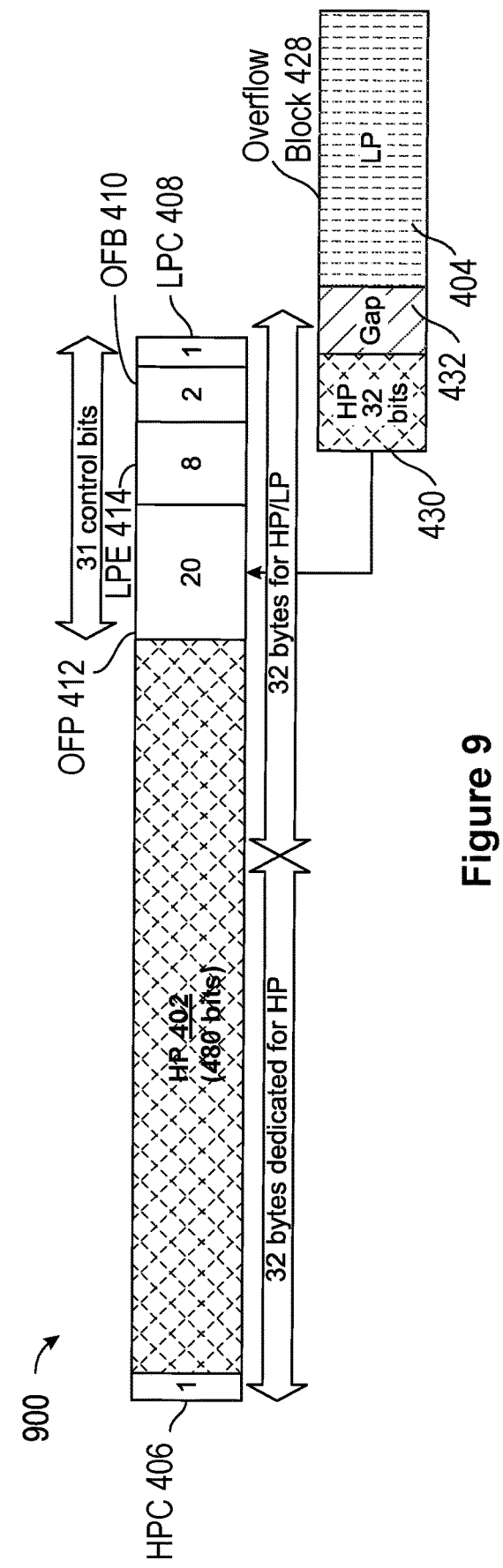
Figure 8
Figure 9

PRIORITY-BASED CACHE-LINE FITTING IN COMPRESSED MEMORY SYSTEMS OF PROCESSOR-BASED SYSTEMS

TECHNICAL FIELD

The disclosed embodiments relate generally to memory systems, and in particular, to priority-based cache-line fitting in compressed memory systems of processor-based systems.

BACKGROUND

As applications executed by conventional processor-based systems increase in size and complexity, memory bandwidth may become a constraint on system performance. While available memory bandwidth may be increased through the use of wider memory communications channels, this approach may incur penalties in terms of increased cost and/or additional area required for the memory on an integrated circuit (IC). One approach to increasing memory bandwidth in a processor-based system without increasing the width of memory communication channels is through the use of data compression. A data compression system can be employed in a processor-based system to store data in a compressed format, thus increasing effective memory capacity without increasing physical memory capacity. In this regard, some conventional data compression systems provide a compression engine to compress data to be written to a main system memory. After performing compression, the compression engine writes the compressed data to the system memory, along with metadata that maps a virtual address of the compressed data to a physical address in the system memory where the compressed data is actually stored. However, because the metadata is used for address mapping, memory access incurs extra reads and writes that negatively impact system performance. For example, accessing a particular cache line in memory may require access to metadata in the memory and an additional layer of address computation to determine the location of the compressed cache line in memory corresponding to the particular cache line. This can increase complexity, cost, and latency to a processor-based system employing memory capacity compression.

SUMMARY

Accordingly, there is a need for systems, methods and techniques that minimize the overheads of traditional compression systems. The techniques described herein can be used to get rid of the meta data for majority of the cache lines and hence improve the average performance of cache line accesses.

In one aspect, a method is provided for compressing data in a compressed memory system of a processor-based system. The method includes partitioning a memory region into a plurality of data regions, each data region associated with a respective priority level. The method also includes selecting (i) a first cache line from a first data region of the plurality of data regions and (ii) a second cache line from a second data region of the plurality of data regions. The first data region has a higher priority level than the second data region. The method also includes compressing (i) the first cache line to obtain a first compressed cache line and (ii) the second cache line to obtain a second compressed cache line. In accordance with a determination that the first cache line is compressible, the method includes writing (i) the first compressed cache line to a first predetermined portion of a candidate compressed cache line, and (ii) either the second cache line or a second portion of the second compressed cache line to a second predetermined portion of the candidate compressed cache line. The first predetermined portion is larger than the second predetermined portion.

In some implementations, the method further includes, in accordance with a determination that (i) the first cache line is not compressible, (ii) the second cache line is not compressible, or (iii) the second compressed cache line does not fit within the second predetermined portion of the candidate compressed cache line, setting an overflow pointer in the candidate compressed cache line. The overflow pointer points to one of a plurality of overflow blocks depending on compressibility of the second cache line or a size of the second compressed cache line. Each overflow block of the plurality of overflow blocks is of a different size.

In some implementations, the method further includes receiving a read request for the first cache line or the second cache line; and in response to receiving the read request: in accordance with a determination that the overflow pointer is set, retrieving data from an overflow block of the plurality of overflow blocks according to the overflow pointer.

In some implementations, the method further includes, in accordance with a determination that the first cache line is compressible: setting a first compressibility control bit in the candidate compressed cache line; and in accordance with a determination that the first cache line is not compressible: writing a first portion of the first cache line to the candidate compressed cache line; writing a remaining portion of the first cache line to an overflow block; resetting the first compressibility control bit in the candidate compressed cache line; and setting an overflow pointer in the candidate compressed cache line to point to the overflow block.

In some implementations, the method further includes, in response to receiving a read request for the first cache line: in accordance with a determination that the first compressibility control bit is set: retrieving the first cache line from the candidate compressed cache line; and in accordance with a determination that the first compressibility control bit is reset: retrieving the first portion of the first cache line from the candidate compressed cache line; and retrieving the second portion of the first cache line from the overflow block based on the overflow pointer.

In some implementations, the method further includes, in accordance with a determination that the first cache line is not compressible: writing either the second cache line or the second compressed cache line to the overflow block depending on whether the second cache line is compressible; and resetting a second compressibility control bit in the candidate compressed cache line to indicate if the second cache line is not compressible.

In some implementations, the method further includes, in response to receiving a read request for the second cache line: retrieving either the second cache line or the second compressed cache line from the overflow block, based on the second compressibility control bit.

In some implementations, the method further includes: in response to receiving a cache line write request for the first cache line: compressing the first cache line to obtain a first updated cache line of a first size; in accordance with a determination that the first size is equal to or less than a first predetermined size of the candidate compressed cache line, writing the first updated cache line to the candidate compressed cache line; in accordance with a determination that the first size is more than the first predetermined size and equal to or less than a second predetermined size of the candidate compressed cache line, performing a read-modifywrite operation on the candidate compressed cache line based on the first updated cache line; and in accordance with a determination that the first size is more than the second predetermined size of the candidate compressed cache line, performing a read-modify-write operation on the candidate compressed cache line and a read-modify-write operation on an overflow block of the plurality of overflow blocks, based on the first updated cache line.

In some implementations, the first predetermined size is a half of size of the candidate compressed cache line.

In some implementations, the method further includes, while writing either the second cache line or the second portion of the second compressed cache line to the second predetermined portion of the candidate compressed cache line, writing an ending bit index in the candidate compressed cache line to indicate where the second cache line or the second portion of the second compressed cache line was written to within the candidate compressed cache line; and computing the second predetermined size based on the ending bit index in the candidate compressed cache line.

In some implementations, the method further includes, in response to receiving a cache line write request for the second cache line: compressing the second cache line to obtain a second updated cache line of a second size; in accordance with a determination that a sum of the second size and the size of the first compressed cache line is less than a first predetermined size of the candidate compressed cache line, performing a read-modify-write operation to write the second updated cache line to the candidate compressed cache line; and in accordance with a determination that the sum of the second size and the size of the first compressed cache line is not less than the first predetermined size of the candidate compressed cache line, performing (i) a first read-modify-write operation to write a first portion of the second updated cache line to the candidate compressed cache line, and (ii) a second read-modify-write operation to write a remaining portion of the second updated cache line to an overflow block pointed to by the overflow pointer.

In some implementations, the method further includes, in response to receiving a cache line write request for the first cache line or the second cache line: compressing the first cache line or the second cache line to obtain an updated compressed cache line of an updated size; and in accordance with a determination that the updated size cannot fit within the overflow block pointed to by the overflow pointer, freeing the overflow pointer and updating the overflow pointer to point to a new overflow block of the plurality of overflow blocks.

In some implementations the first compressed cache line, the second compressed cache line, and the candidate compressed cache line are of equal size.

In some implementations, the first data region and the second data region are of equal size.

In some implementations, the second predetermined portion is less than half the size of the candidate compressed cache line.

In some implementations, the first compressed cache line and the second compressed cache line are written to the candidate compressed cache line in opposite directions. The first compressed cache line and the second compressed cache line are separated by one or more bytes.

In another aspect, a compressed memory system of a processor-based system is provided. The compressed memory system includes a memory partitioning circuit configured to partition a memory region into a plurality of data regions. Each data region is associated with a respective priority level. The compressed memory system also includes a cache line selection circuit configured to select (i) a first cache line from a first data region of the plurality of data regions and (ii) a second cache line from a second data region of the plurality of data regions. The first data region has a higher priority level than the second data region. The compressed memory system also includes a compression circuit configured to compress (i) the first cache line to obtain a first compressed cache line and (ii) the second cache line to obtain a second compressed cache line. The compressed memory system also includes a cache line packing circuit configured to: in accordance with a determination that the first cache line is compressible: write (i) the first compressed cache line to a first predetermined portion of a candidate compressed cache line, and (ii) either the second cache line or a second portion of the second compressed cache line to a second predetermined portion of the candidate compressed cache line. The first predetermined portion is larger than the second predetermined portion.

In some implementations, the cache line packing circuit is further configured to: in accordance with a determination that (i) the first cache line is not compressible, (ii) the second cache line is not compressible, or (iii) the second compressed cache line does not fit within the second predetermined portion of the candidate compressed cache line: set an overflow pointer in the candidate compressed cache line. The overflow pointer points to one of a plurality of overflow blocks depending on compressibility of the second cache line or a size of the second compressed cache line, and each overflow block of the plurality of overflow blocks is of a different size.

In some implementations, the cache line packing circuit is further configured to: receive a read request for the first cache line or the second cache line; and in response to receiving the read request: in accordance with a determination that the overflow pointer is set, retrieve data from an overflow block of the plurality of overflow blocks according to the overflow pointer.

In some implementations, the cache line packing circuit is further configured to: in accordance with a determination that the first cache line is compressible: set a first compressibility control bit in the candidate compressed cache line; and in accordance with a determination that the first cache line is not compressible: write a first portion of the first cache line to the candidate compressed cache line; write a remaining portion of the first cache line to an overflow block; reset the first compressibility control bit in the candidate compressed cache line; and set an overflow pointer in the candidate compressed cache line to point to the overflow block.

In some implementations, the cache line packing circuit is further configured to: in response to receiving a read request for the first cache line: in accordance with a determination that the first compressibility control bit is set: retrieve the first cache line from the candidate compressed cache line; and in accordance with a determination that the first compressibility control bit is reset: retrieve the first portion of the first cache line from the candidate compressed cache line; and retrieve the second portion of the first cache line from the overflow block based on the overflow pointer.

In some implementations, the cache line packing circuit is further configured to: in accordance with a determination that the first cache line is not compressible: write either the second cache line or the second compressed cache line to the overflow block depending on whether the second cache line is compressible; and reset a second compressibility control bit in the candidate compressed cache line to indicate if the second cache line is not compressible.

In some implementations, the cache line packing circuit is further configured to: in response to receiving a read request for the second cache line: retrieve either the second cache line or the second compressed cache line from the overflow block, based on the second compressibility control bit.

In some implementations, the cache line packing circuit is further configured to: in response to receiving a cache line write request for the first cache line: compress the first cache line to obtain a first updated cache line of a first size; in accordance with a determination that the first size is equal to or less than a first predetermined size of the candidate compressed cache line, write the first updated cache line to the candidate compressed cache line; in accordance with a determination that the first size is more than the first predetermined size and equal to or less than a second predetermined size of the candidate compressed cache line, perform a read-modify-write operation on the candidate compressed cache line based on the first updated cache line; and in accordance with a determination that the first size is more than the second predetermined size of the candidate compressed cache line, perform a read-modify-write operation on the candidate compressed cache line and a read-modify-write operation on an overflow block of the plurality of overflow blocks, based on the first updated cache line.

In some implementations, the first predetermined size is a half of size of the candidate compressed cache line.

In some implementations, the cache line packing circuit is further configured to: while writing either the second cache line or the second portion of the second compressed cache line to the second predetermined portion of the candidate compressed cache line, write an ending bit index in the candidate compressed cache line to indicate where the second cache line or the second portion of the second compressed cache line was written to within the candidate compressed cache line; and compute the second predetermined size based on the ending bit index in the candidate compressed cache line.

In some implementations, the cache line packing circuit is further configured to: in response to receiving a cache line write request for the second cache line: compress the second cache line to obtain a second updated cache line of a second size; in accordance with a determination that a sum of the second size and the size of the first compressed cache line is less than a first predetermined size of the candidate compressed cache line, perform a read-modify-write operation to write the second updated cache line to the candidate compressed cache line; and in accordance with a determination that the sum of the second size and the size of the first compressed cache line is not less than the first predetermined size of the candidate compressed cache line, perform (i) a first read-modify-write operation to write a first portion of the second updated cache line to the candidate compressed cache line, and (ii) a second read-modify-write operation to write a remaining portion of the second updated cache line to the overflow block pointed to by the overflow pointer.

In some implementations, the cache line packing circuit is further configured to: in response to receiving a cache line write request for the first cache line or the second cache line: compress the first cache line or the second cache line to obtain an updated compressed cache line of an updated size; and in accordance with a determination that the updated size cannot fit within the overflow block pointed to by the overflow pointer, free the overflow pointer and updating the overflow pointer to point to a new overflow block of the plurality of overflow blocks.

In some implementations, the first compressed cache line, the second compressed cache line, and the candidate compressed cache line are of equal size.

In some implementations, the first data region and the second data region are of equal size.

In some implementations, the second predetermined portion is less than half the size of the candidate compressed cache line.

In some implementations, the cache line packing circuit is further configured to: write the first compressed cache line and the second compressed cache line to the candidate compressed cache line in opposite directions. The first compressed cache line and the second compressed cache line are separated by one or more bytes.

In another aspect, a compressed memory system of a processor-based system is provided. The compressed memory system includes a memory region comprising a plurality of cache lines. Each cache line has one of a plurality of priority levels. The compressed memory system also includes a compressed memory region comprising a plurality of compressed cache lines. Each compressed cache line includes a first set of data bits configured to hold, in a first direction, either a portion of a first cache line or a portion of the first cache line after compression, the first cache line having a first priority level. Each compressed cache line also includes a second set of data bits configured to hold, in a second direction opposite to the first direction, either a portion of a second cache line or a portion of the second cache line after compression, the second cache line having a second priority level lower than the first priority level. The first set of data bits includes a greater number of bits than the second set of data bits.

In some implementations, the compressed memory system further includes an overflow memory region including a plurality of overflow bins. Each overflow bin is configured to hold a distinct number of bytes. Each compressed cache line further includes a set of overflow pointer bits configured to hold a pointer to an overflow bin of the plurality of overflow bins.

In some implementations, each compressed cache line further includes: a first control bit to indicate a compressibility of the first cache line; and a second control bit to indicate a compressibility of the second cache line.

In some implementations, the compressed memory system further includes an overflow memory region including a plurality of overflow bins, wherein each overflow bin is configured to hold a distinct number of bytes. Each compressed cache line further includes a set of bits configured to hold a size of an overflow bin of the plurality of overflow bins.

In some implementations, each compressed cache line further includes an ending bit index indicating an end of the second set of data bits.

In some implementations, each overflow bin is configured to hold bits of the first cache line, and/or bits of the second cache line or the second cache line after compression, in the first direction.

In some implementations, the first set of data bits is separated by one or more bytes from the second set of data bits.

In some implementations, each cache line and each compressed cache line are of a same size.

In some implementations, when the first cache line after compression or the second cache line after compression does not fit in the compressed cache line then each compressed cache line further includes a set of overflow pointer bits configured to hold a pointer to an overflow bin of the plurality of overflow bins. The overflow bin is configured to hold bits of the first cache line, the first cache line after compression, the second cache line, and/or the second cache line after compression.

In some implementations, the second set of data bits is further configured to hold a plurality of control bits that indicate overflow and an end of the second set of data bits in a compressed cache line.

In another aspect, a non-transitory computer-readable medium is provided. The non-transitory computer-readable medium stores thereon computer-executable instructions which, when executed by a processor, cause the processor to perform any of the methods described herein.

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable higher throughput in storage to memory devices.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIGS. 4-9 show example compressed line layouts, according to some implementations.

Figure 1:
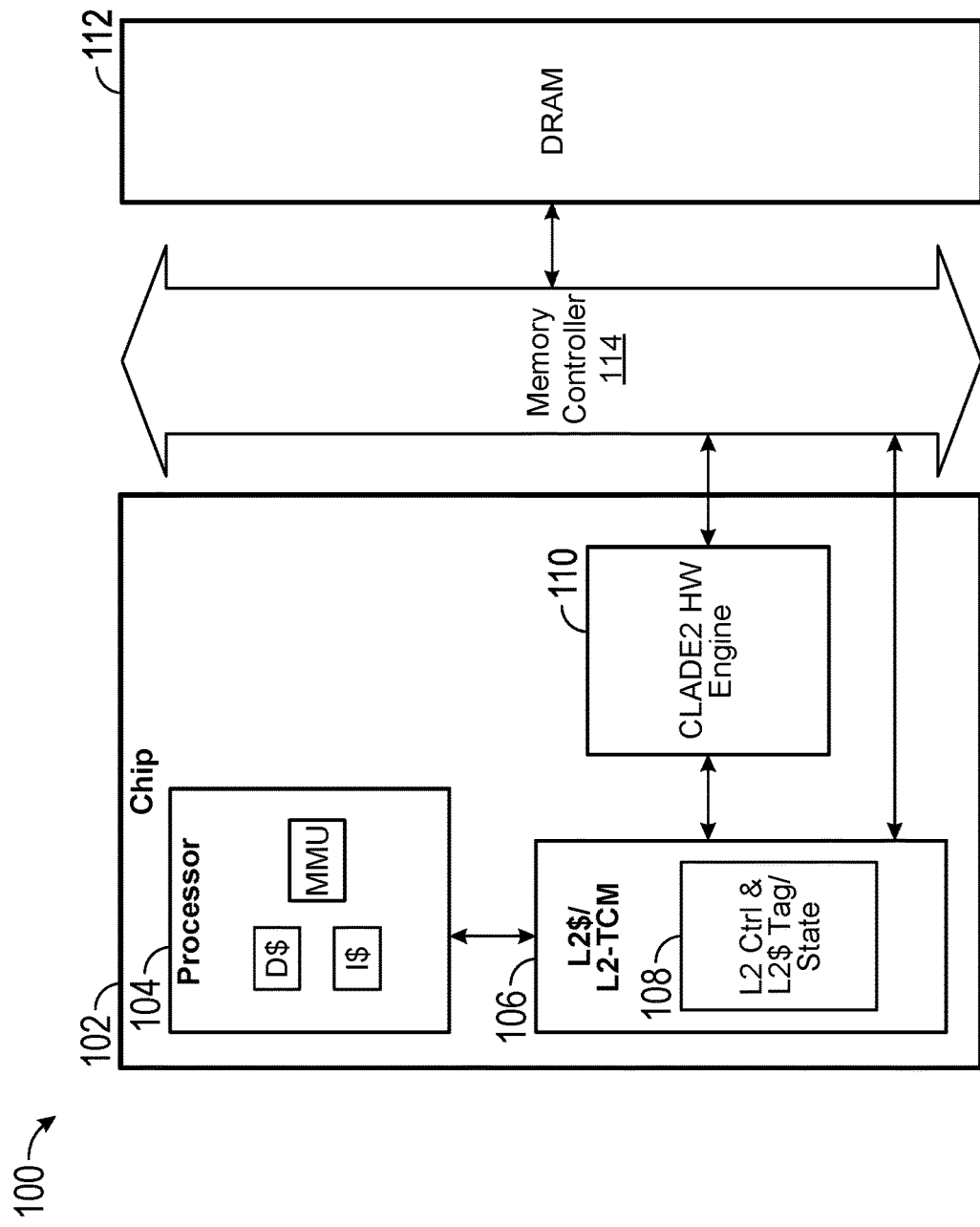
FIG. 1 is a schematic diagram of an example system with a cache line compression/decompression hardware engine, according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a schematic diagram of an example system 100 with a cache line compression/decompression hardware engine 110, according to some implementations. The system 100 includes a chip 102 that in turn includes a processor 104, a level 2 (L2) cache or L2 tightly coupled memory (TCM) 106, and a compression/decompression hardware engine 110. The processor 104 includes a memory management unit (MMU), a data cache, and an instruction cache. The data cache and the instruction cache constitute a level 1 (L1) cache. The L2 cache or L2 TCM 106 includes a L2 control and L2 cache tag or state module 108. The system also includes a memory controller 114 for accessing a main, external memory (e.g., double rate dynamic random access memory (DRAM), sometimes called DDR). Although not shown in FIG. 1, some implementations may include conventional peripherals, other storage, an express peripheral component interconnect (PCI) interface, a direct memory access (DMA) controller, and/or an integrated memory controller (IMC). Some implementations may include two or more processors or processor blocks, and/or a shared level 3 (L3) cache for storing cache data that is used by any of, or shared among, each of the processor blocks. Some implementations include an internal system bus that allows each of the processor blocks to access the shared L3 cache and/or other shared resources including the memory controller 114. The processor-based system 100 is configured to store cache data in uncompressed form in cache entries in a cache memory. The cache entries may be cache lines. For example, the cache memory may be a L2 cache memory (e.g., the L2 cache 106). The cache memory may be private to a processor core in the processor 104 or shared between multiple processor cores. The processor-based system 100 includes a system memory 112 that includes a compressed data region configured to store data in memory entries (which may be memory lines) in compressed form. For example, the system memory 112 may include a double data rate (DDR) static random access memory (SRAM). The processor 104 is configured to access the system memory 112 during read and write operations to execute software instructions and perform other processor operations.

Figure 2A:
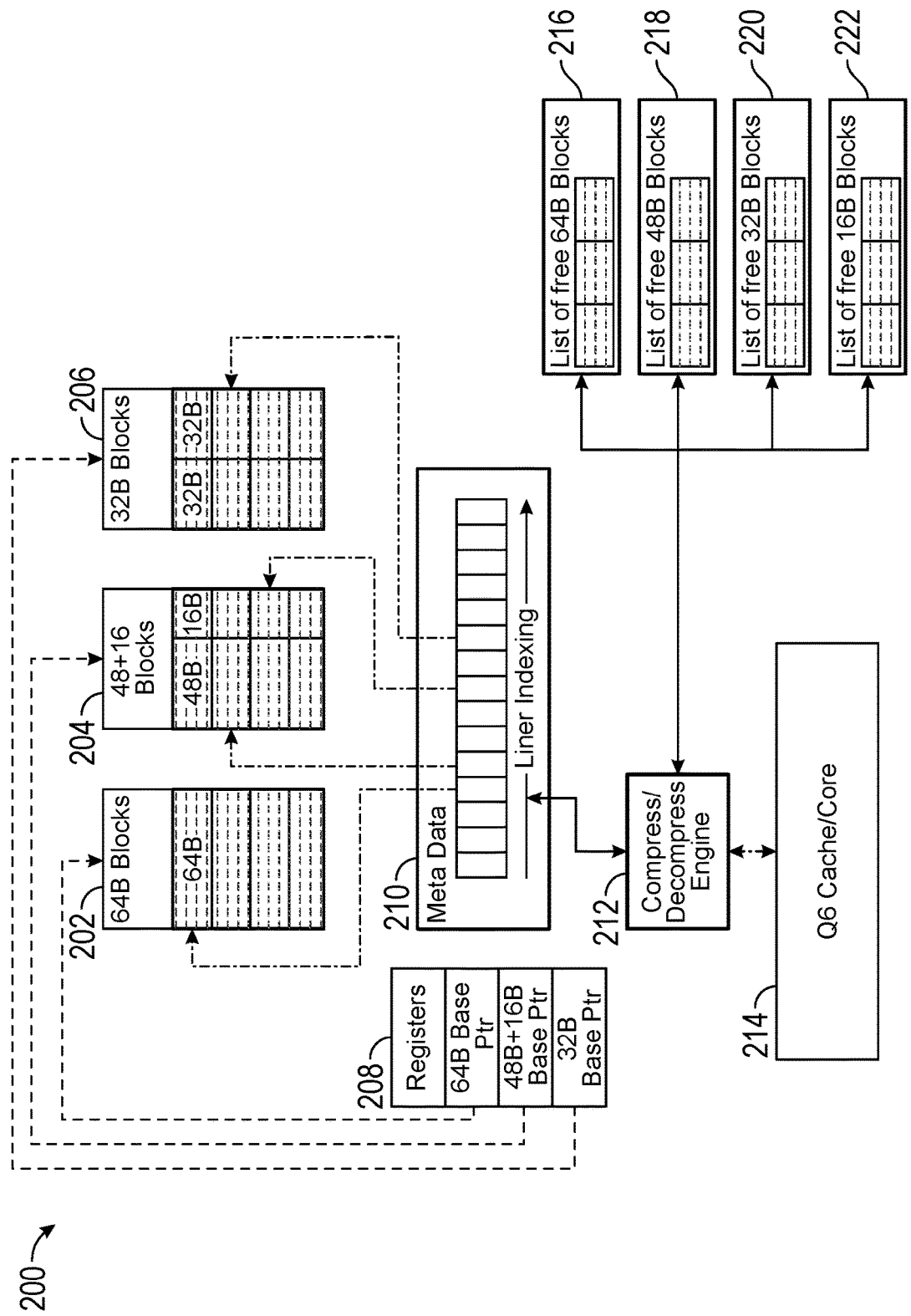
FIG. 2A is a schematic diagram of a compressed memory system 200, according to some implementations.

FIG. 2A is a schematic diagram of a compressed memory system 200, according to some implementations. The compressed memory system is configured to compress cache data from an evicted cache entry in a cache memory and read metadata used to access a physical address in the compressed system memory to write the compressed cache data.

Providing the ability to store compressed data in a compressed data region (e.g., blocks 202, 204, 206) increases memory capacity of the processor-based system 100 over physical memory size of the system memory 112. In some implementations, the processor 104 uses virtual addressing. A virtual-to-physical address translation is performed to effectively address the compressed data region without being aware of the compression system and compression size of the compressed data region. In this regard, a compression or decompression engine 212 is provided in the compressed memory system 200 to compress uncompressed data from the processor 104 to be written into the compressed data region, and to decompress compressed data received from the compressed data region to provide such data in uncompressed form to the processor 104. The compression or decompression engine 212 may include a compress circuit configured to compress data from the processor 104 to be written into the compressed data region. For example, as shown in FIG. 1, the compress circuit may be configured to compress 64-byte (64 B) data words down to 48-byte (48 B) compressed data words, 32-byte (32 B) compressed data words, or 16-byte (16 B) compressed data words, which can be stored in respective memory blocks 202(64 B), 204(48 B), 206(32 B), and 204(16 B), each having a smaller size than each of the entire memory entries of the system memory 112. If uncompressed data from the processor 104 cannot be compressed down to the next smaller-sized memory block 125 configured for the compressed memory system 102, such uncompressed data is stored uncompressed over the entire width of one of the memory entries. For example, the width of the one of the memory entries may be 64 B, and thus can store 64 B memory blocks, such as the memory block 202(64 B). The compression or decompression engine 212 also includes a decompress circuit configured to decompress compressed data from the compressed data region to be provided to the processor 104.

However, to provide for faster memory access without the need to compress and decompress, cache memory 214 (e.g., the L2 cache 106) is provided. Cache entries in the cache memory 214 are configured to store the cache data in uncompressed form. Each of the cache entries may be the same width as each of the memory entries for performing efficient memory read and write operations. The cache entries are accessed by respective virtual address ("VA") tags (e.g., tags stored in the L2 cache tag 108), because as discussed above, the compressed memory system 200 provides more addressable memory space to the processor 104 than physical address space provided in the compressed data region. When the processor 104 issues a memory read request for a memory read operation, a virtual address of the memory read request is used to search the cache memory 214 to determine if the virtual address matches one of the virtual address tags of the cache entries. If so, a cache hit occurs, and the cache data in the hit cache entry of the cache entries is returned to the processor 104 without the need to decompress the cache data. However, because the number of the cache entries is less than the number of the memory entries, a cache miss can occur where the cache data for the memory read request is not contained in the cache memory 214.

Thus, with continuing reference to FIG. 2A, in response to a cache miss, the cache memory 214 is configured to provide the virtual address of the memory read request to the compression circuit to retrieve data from the compressed data region. In this regard, the compression circuit may first consult a metadata cache that contains metadata cache entries each containing metadata indexed by a virtual address. The metadata cache is faster to access than the compressed data region. The metadata is data, such as a pointer, used to access a physical address (PA) in the compressed data region to access the memory entries containing the compressed data for the virtual address. If the metadata cache contains the metadata for the memory read request, the compression circuit uses the metadata to access the correct memory entry of the memory entries in the compressed data region to provide the corresponding compressed data region to the decompress circuit. If the metadata cache does not contain the metadata for the memory read request, the compression circuit provides the virtual address for the memory read request to a metadata circuit 210 that contains metadata in corresponding metadata entries for all virtual address space in the processor-based system 100. Thus, the metadata circuit 210 can be linearly addressed by the virtual address of the memory read request. The metadata is used to access the correct memory entry of the memory entries in the compressed data region for the memory read request to provide the corresponding compressed data region to the decompress circuit.

With continuing reference to FIG. 2, the decompress circuit receives the compressed data region in response to the memory read request. The decompress circuit decompresses the compressed data region into uncompressed data, which can then be provided to the processor 104. The uncompressed data is also stored in the cache memory 214. However, if the cache memory 214 does not have an available cache entry of the cache entries, the cache memory 214 may evict one of the existing cache entries to the compressed data region to make room for storing the uncompressed data.

To do so, the cache memory 214 first sends the virtual address and uncompressed cache data of the evicted cache entry to the compress circuit. The compress circuit receives the virtual address and the uncompressed cache data for the evicted cache entry. The compress circuit initiates a metadata read operation to the metadata cache to obtain metadata associated with the virtual address. During, before, or after the metadata read operation, the compress circuit compresses the uncompressed cache data into compressed data to be stored in the compressed data region. If the metadata read operation to the metadata cache results in a cache miss, the metadata cache issues a metadata read operation to the metadata circuit 210 in the system memory 112 to obtain metadata associated with the virtual address. The metadata cache is then stalled. Because accesses to the compressed data region can take much longer than the processor 104 can issue memory access operations, uncompressed data received from the processor 104 for subsequent memory write requests may be buffered in a memory request buffer.

After the metadata comes back from the compressed data region to update the metadata cache, the metadata cache provides the metadata as the metadata to the compress circuit. The compress circuit determines whether the new compression size of the compressed data region fits into the same memory block size in the compressed data region as used to previously store data for the virtual address of the evicted cache entry. For example, the processor 104 may have updated the cache data in the evicted cache entry since being last stored in the compressed data region. If a new memory block is needed to store the compressed data region for the evicted cache entry, the compress circuit recycles a pointer to the current memory block in the compressed memory system 200 associated with the virtual address of the evicted cache entry to one of free memory lists (e.g., list of free 64 B blocks 216, list of free 48 B blocks 218, list of free 32 B blocks 220, and list of free 16 B blocks 222) of pointers to available memory blocks in the compressed data region. The compress circuit then obtains the pointer from one of the free memory lists to the new, available memory block of desired memory block size in the compressed data region to store the compressed data region for the evicted cache entry. The compress circuit then stores the compressed data region for the evicted cache entry in the memory block in the compressed data region associated with the virtual address for the evicted cache entry determined from the metadata.

If a new memory block was assigned to the virtual address for the evicted cache entry, the metadata in the metadata cache entry of the metadata cache entries corresponding to the virtual address tag of the virtual address tags of the evicted cache entry is updated based on the pointer to the new memory block. The metadata cache then updates the metadata in the metadata entry of the metadata entries corresponding to the virtual address in the metadata cache based on the pointer to the new memory block 125.

Because the metadata of the metadata circuit 210 is stored in the system memory 112, the metadata circuit 210 may consume an excessive amount of the system memory 112, thus negatively impacting system performance. Accordingly, it is desirable to minimize the amount of the system memory 112 that is required to store the metadata, while still providing effective data compression. In this regard, some implementations of the compressed memory system 200 reduce metadata size. The techniques described herein can be used to FIG. 2A shows the uncompressed data indexed linearly through meta data, according to some implementations. An uncompressed cache line is represented by 3 bytes of meta data and the meta data points to a compressed block with size 16, 32, 48 or 64 bytes (e.g., the blocks 202, 204, and 206). In some implementations, if the whole uncompressed line is 0, the meta data circuit 210 flags that without pointing to any compressed block. In some implementations, the compressed memory system 200 includes a register file 208 that holds base pointers for the blocks 202, 204, and 206, and the metadata circuit 210 provides offsets from the base pointers for the blocks.

Figure 2B:
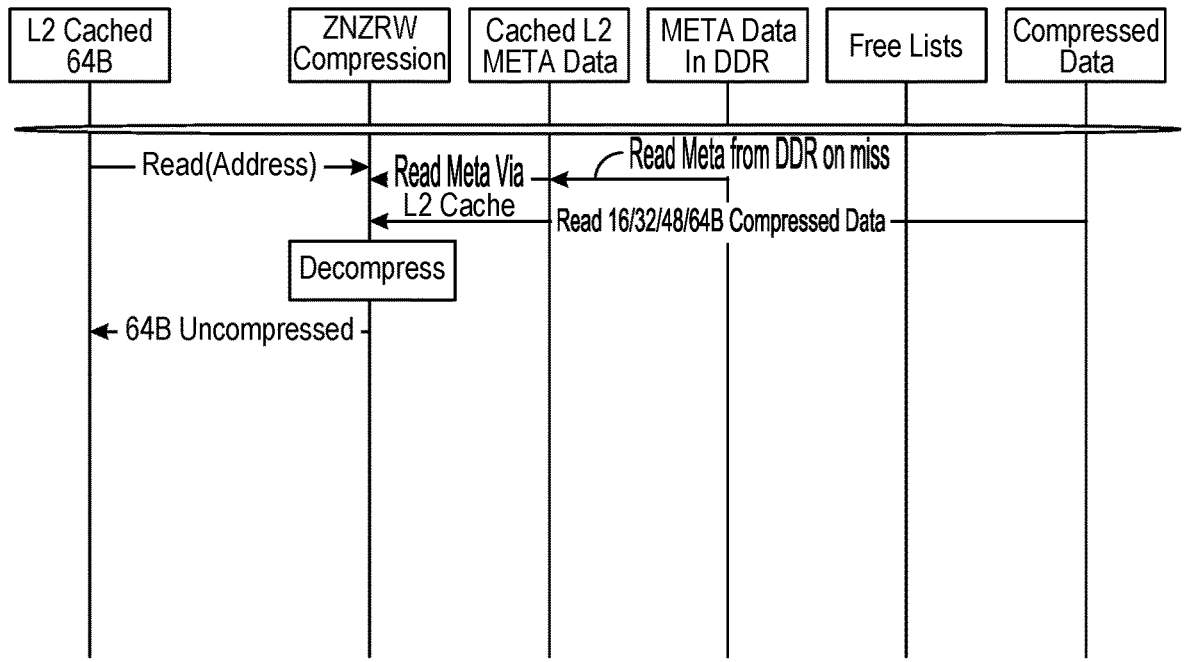
FIG. 2B is a sequence diagram illustrating a method for reading cache lines using the compressed memory system shown in FIG. 2A, according to some implementations.

FIG. 2B is a sequence diagram illustrating a method for reading cache lines using the compressed memory system shown in FIG. 2A, according to some implementations. Following a L2 cache miss, a read address for the external memory is sent to the compression or decompression engine 212 which fetches cached L2 metadata if it is available. If the metadata is not available in the cache, the metadata is read from the external memory (e.g., DDR). Based on the metadata, compressed data is fetched from the external memory from a block of the compressed data region. The compressed data is then decompressed by the decompression circuit and the uncompressed data is returned to the processor. With this methodology, a 0 cache line (e.g., 64 bytes of 0s) requires one read, and other cache lines require two reads—one read for the metadata and one read for the compressed block.

Figure 2C:
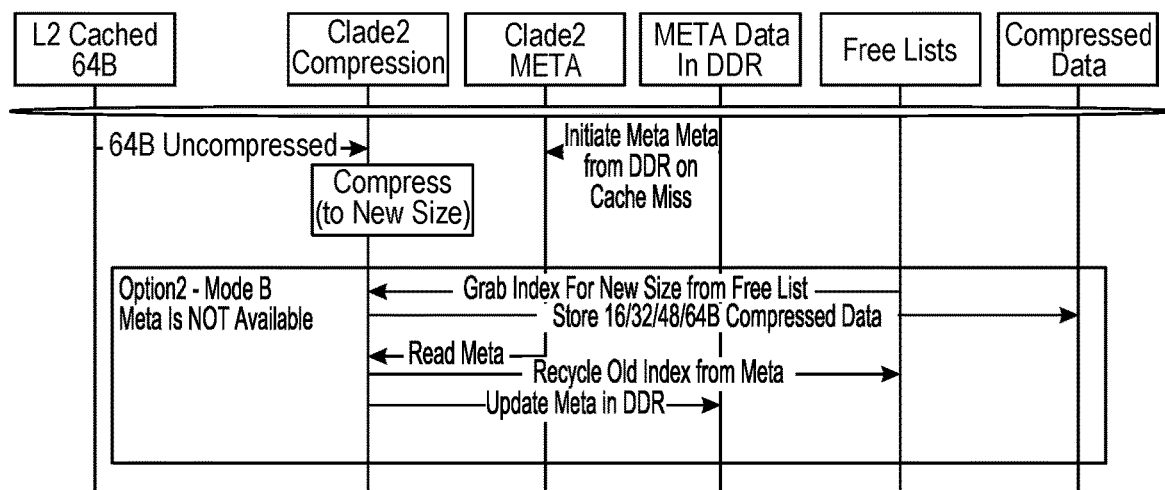
FIG. 2C is a sequence diagram illustrating a method for writing cache lines using the compressed memory system shown in FIG. 2A, according to some implementations.

FIG. 2C is a sequence diagram illustrating a method for writing cache lines using the compressed memory system shown in FIG. 2A, according to some implementations. Following a L2 cache miss, uncompressed data is sent to the compression or decompression engine 212, and the compression circuit compresses the data to a new size. Similar to FIG. 2B, if the metadata is not available in the metadata cache, the metadata is retrieved from the external memory.

If the metadata is available in the metadata cache, the metadata is retrieved from the metadata cache. A new index for the new size may be retrieved from the free list (e.g., one of the lists 216, 218, 220, 222) depending on the size of the compressed data, and the compressed data is written to the compressed data region. In some situations, old index may be recycled, and metadata is updated in the external memory. With this methodology, for cache line writes, if cache line is all 0s, the write requires one read-modified-write for meta data, other cache lines require one read-modified-write for meta data, and one write or one read-modified-write for compressed data depending on the size of the compressed block.

Figure 3:
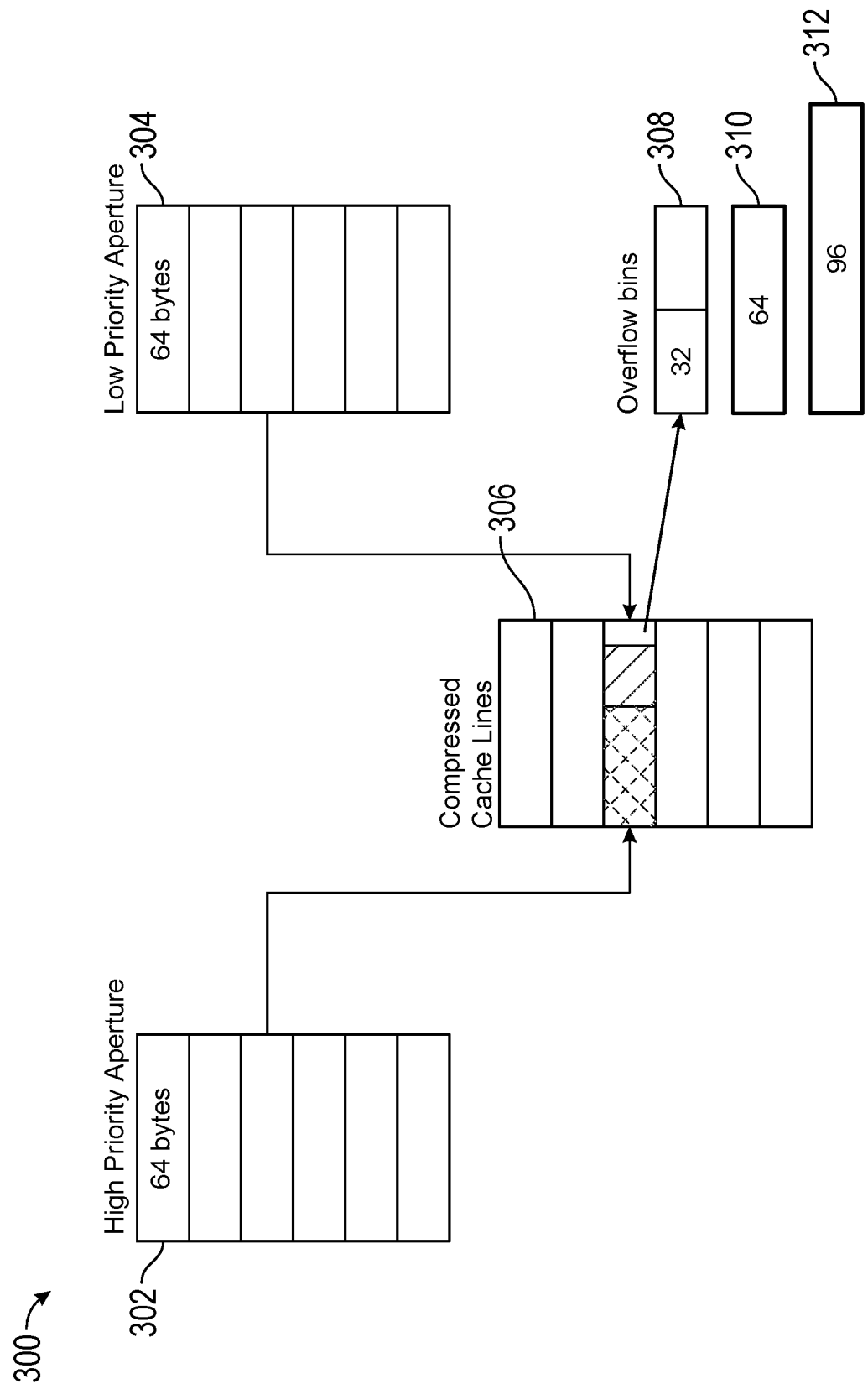
FIG. 3 is a schematic diagram of a packing scheme for compressed memory systems, according to some implementations.

FIG. 3 is a schematic diagram of a packing scheme 300 for compressed memory systems that help avoid the extra reads and writes of metadata described above, according to some implementations. FIG. 3 shows a memory region (e.g., a compression data candidate) partitioned into high and low priority parts 302 and 304 with equal size. In practice, the memory region may be partitioned into any number of partitions with different priority levels, and/or the partitions may have unequal amount of data. One high priority cache line and one low priority cache line are selected and compressed to fit in a compressed cache line 306. In case the compressed high and low cache lines do not fit in one compressed cache line, an overflow pointer is reserved in the compressed line that points to an overflow block (e.g., overflow bins 308, 310, or 312, each bin having a different size). To avoid read-modified-write, some implementations use a plurality of overflow blocks (e.g., the overflow bin holds 32 bytes of data, the overflow bin 310 holds 64 bytes of data, and the overflow bin 312 holds 96 bytes of data). To improve the write performance of high priority lines, the compressed low priority line only occupies the lower half of the compressed line.

FIGS. 4-9 show example compressed line layouts, according to some implementations. The examples are provided for illustration and should not be construed to mean that the layouts or the organizations are only limited to these examples. Referring to FIG. 4, a compressed line (CL) 400 may include: (i) HP 402 which indicates compressed data for a high priority cache line; (ii) LP 404 which indicates compressed data for a low priority cache line; (iii) HPC 406 which is a flag that indicates whether the high priority cache line is compressed. For example, 1 indicates compressed, 0 indicates not compressed; (iv) LPC 408 which is a flag that indicates whether the low priority cache line is compressed. For example, 1 indicates compressed, 0 indicates not compressed; (v) OFB 410 which indicates overflow bin size. For example, 0 indicates 32 bytes, 1 indicates 64 bytes, 2 indicates 96 bytes, and 3 indicates no overflow; (vi) OFP 412 which indicates an overflow pointer index; and/or (vii) LPE 414 which indicates a low priority ending bit index, indicating where the low priority compressed data ends. This information can be used to expand the high priority cache line on the write path. Value may be between 11 and 255. 0 may mean no space left for HP to expand. Implementations may use any number of these fields. In some implementations, high priority compression or decompression starts from HPC bit towards the OFP, as indicated by the arrow 416. In some implementations, low priority compression or decompression starts from the OFP towards where LPE points (as indicated by the arrow 418), and it continues from right to left in the overflow region if it has an overflow (as indicate by the arrow 420). Region 420 of the CL is unused by CL, and/or the HP 402 and LP 404 are separated by a gap 422, according to some implementations. In the example shown in FIG. 4, 32 bytes are dedicated for HP, and 32 bytes can be used by either HP/LP, and there are 31 control bits including the OFP 412, LPE 414, OFB 410, and LPC 408. Depending on the HP and LP compressed size, the compressed line may have slightly different layout as further described below in reference to FIGS. 5-10, according to some implementations. For example, the number of control bits may be reduced (e.g., because there is no overflow, there is no need for an OFP, and the bits are instead consumed by LP).

FIG. 5 shows an example compressed line layout 500 when HP is less than 256 bits and low priority lines fit in a CL, according to some implementations. HPC is set to 1, OFB is set to 0×11, and LPC is set to 1, according to some implementations. There are only 11 control bits (as opposed to 31 bits in FIG. 4).

Figure 6:
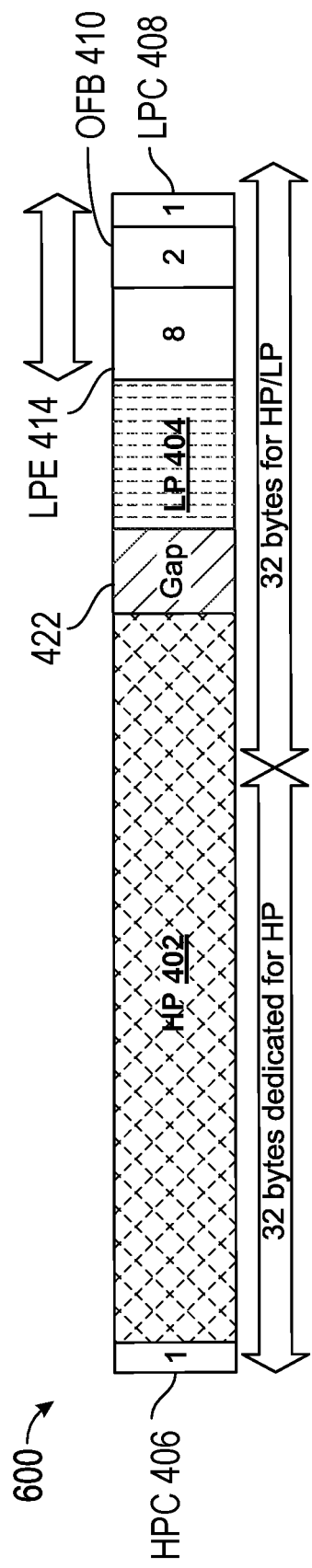

FIG. 6 shows an example compressed line layout 600 when both HP and LP fit in one CL, and HP is greater than 255 bits, according to some implementations. HPC is set to 1, OFB is set to 0×11, and LPC is set to 1, according to some implementations. HP has expanded into the lower half of the CL, in this example.

Figure 7:
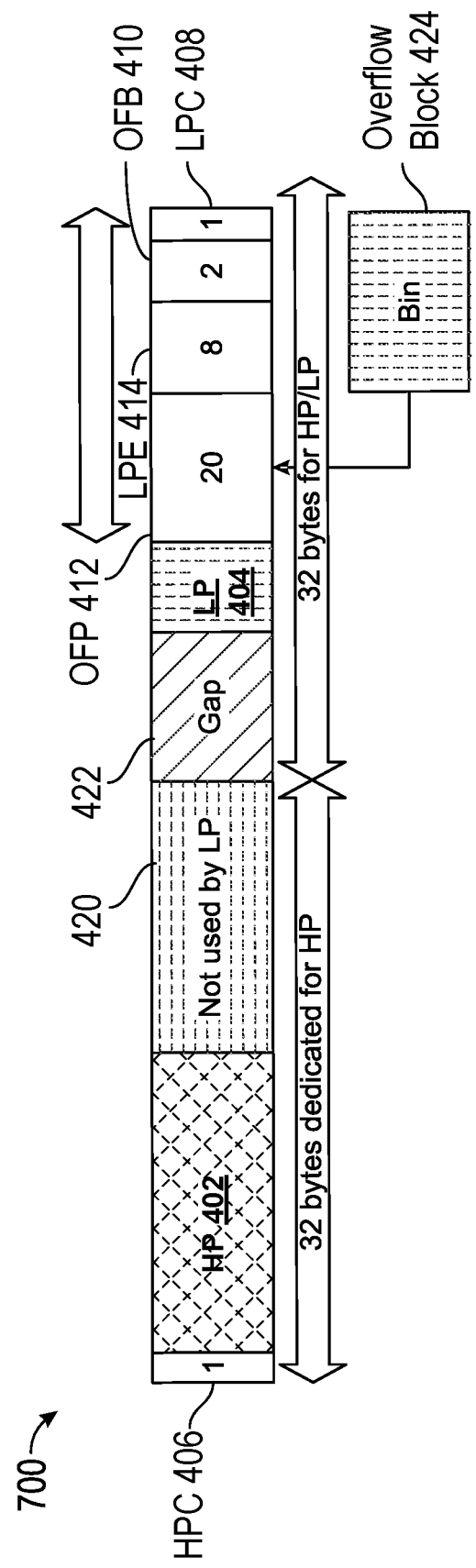

FIG. 7 shows an example compressed line layout 700 when HP is less than 256 bits, and LP has overflow, according to some implementations. HPC is set to 1, OFB is any value between 0×0 and 0×2, and LPC is set to either 1 or 0, and OFP points to an overflow block 424, according to some implementations.

FIG. 8 shows an example compressed line layout 800 when HP is greater than 255 bits but less than 480 bits, and LP has overflow, according to some implementations. HPC is set to 1, OFB is set to a value between 0 and 2, LPC is either 1 or 0, and OFP points to an overflow block 426, according to some implementations.

FIG. 9 shows an example compressed line layout 900 when HP is equal to 512 (not compressible), and LP has overflow, according to some implementations. HPC is set to 0, OFB is set to a value between 0 and 2, LPC is set to 0 or 1, and OFP points to an overflow block 428, according to some implementations. The overflow block 428 includes the remaining 32 bits of HP 430, a gap 432 and the LP 404.

Example Read/Write Overhead and Statistics

For cache line read, high and low priority cache line fitting in one compressed cache line require one read, and other cache lines require two reads, one for compressed line and one for overflow block. For cache line write, compressed high priority cache line fitting in 255 bits requires one write, compressed high priority cache line fitting in 256-480 bits requires one read-modified-write, and other non-compressible high priority cache lines (>480 bits) require one read-modified-write to a compressed line and one read-modified-write to an overflow block; low priority cache line fitting in the compressed line requires one read-modified-write, low priority cache line not fitting in the compressed line requires one read-modified-write to compressed line and one read-modified-write to an overflow block.

Following table shows example cache line read/write cost and statistics for a modem data (50017075 bytes of compression candidate data).

| Category | Cache Lines | % |
| --- | --- | --- |
| HP fit in 255 bits | 330,998 | 84.71 |
| HP fit in line (HP requires one read) | 374,207 | 95.77 |
| HP/LP fit in line (LP requires one read) | 307,134 | 78.6 |

From the statistics, 84.7% of high priority cache line requires only one read/one write for cache line read/write. Additional 11% high priority cache lines on top of above requires one read/one read-modified-write for cache line read/write. Only 4.3% of the high priority cache lines require two reads/two read-modified-writes for cache line read/write. 78.6% of low priority cache lines require one read/one read-modified-write for cache line read/write. 21.4% of low priority cache line require two reads/two read-modified-writes for cache line read/write.

In FIGS. 10-13 described below, memory reads and writes are indicated by a pattern inside the rectangular boxes, and all other operations (except for the initial blocks receiving read or write requests) are shown without any pattern. Also, operations that are predicted to be of high probability are shown in solid line (i.e., the solid arrows indicate paths of high probability), and other paths are shown as dashed lines or arrows. The probabilities of the paths are based on data distribution for particular datasets (e.g., modem data).

Figures 10, 11:
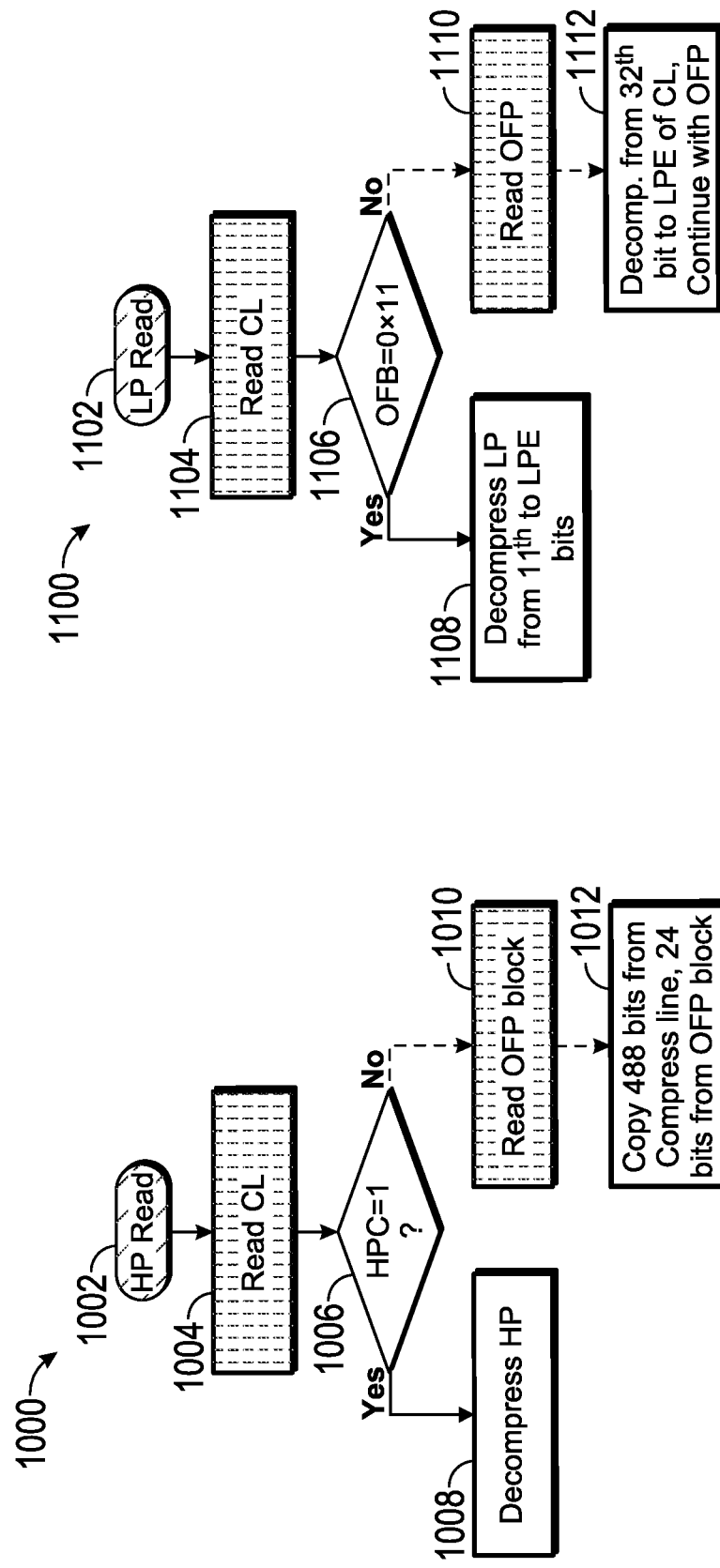
FIG. 10 shows a flowchart for an example method for reading high priority cache lines, according to some implementations.
FIG. 11 shows a flowchart for an example method for reading low priority cache lines, according to some implementations.

FIG. 10 shows a flowchart for an example method 1000 for reading high priority cache lines, according to some implementations. The method 1000 includes receiving (1002) a request for a HP read, and reading (1004) a CL. The method also includes determining (1006) if HPC is equal to 1. If HPC is 1, the HP is decompressed. If HPC is not 1, then an overflow block pointed to by OFP is read (1010), and 480 bits are copied (1012) from compress line and 32 bits are copied from OFP block.

FIG. 11 shows a flowchart for an example method 1100 for reading low priority cache lines, according to some implementations. The method 1100 includes receiving (1102) a request for a LP read, and reading (1104) a CL. The method also includes determining (1106) if OFB is set to 3 (hexadecimal value 0×11). If OFB is set to 3, the LP is decompressed (1108) from $11^{th}$ to LPE bits. If OFB is not set to 3, then the OFP is read (1110) and bits from $32^{nd}$ to LPE of CL is decompressed and bits from overflow block pointed to by OFP are added (1112).

Figure 12:
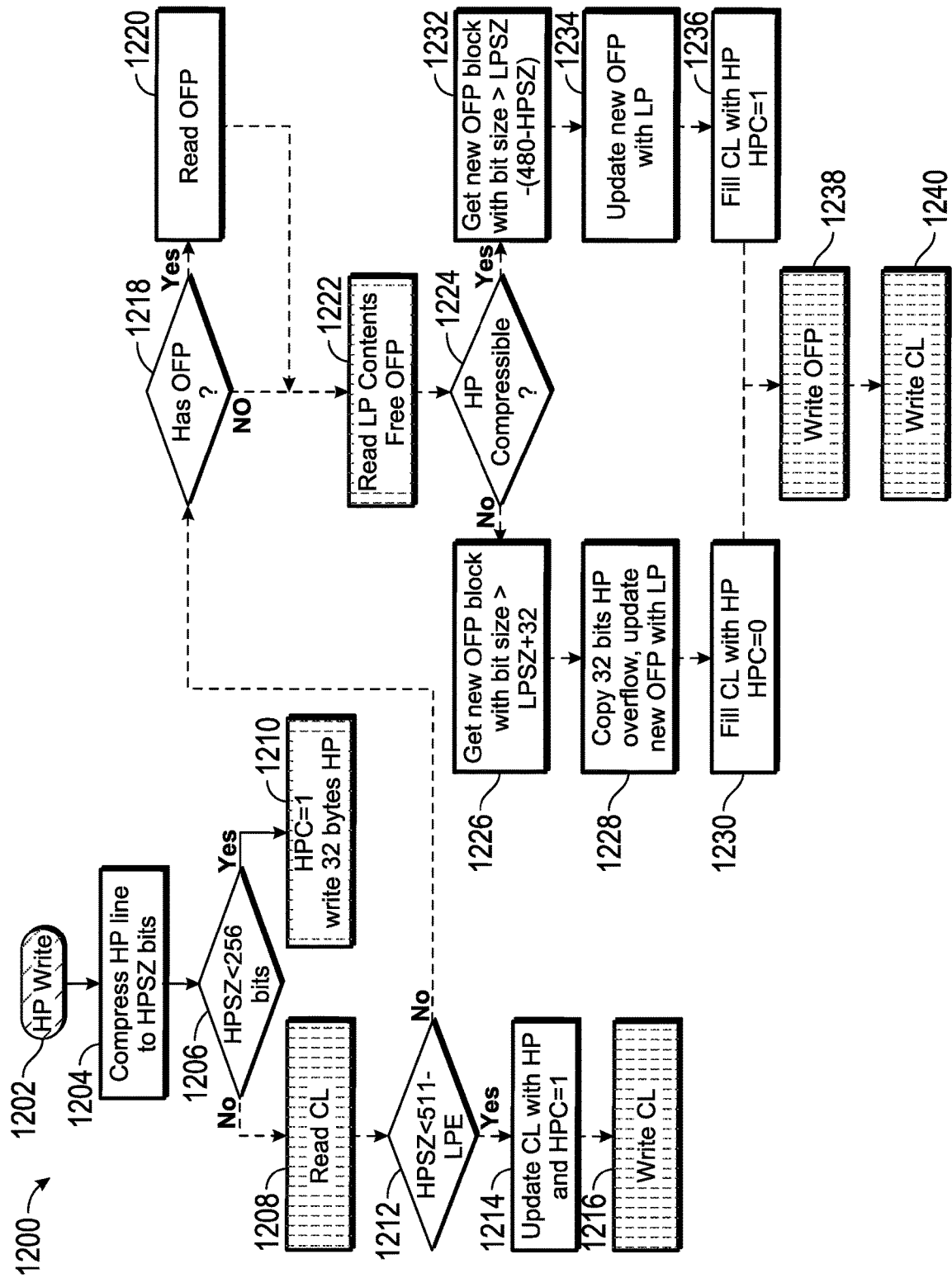
FIG. 12 shows a flowchart for an example method for writing high priority cache lines, according to some implementations.

FIG. 12 shows a flowchart for an example method 1200 for writing high priority cache lines, according to some implementations. The method includes receiving (1202) a HP write request and compressing (1204) HP line to HPSZ bits. The method also includes determining (1206) if HPSZ is less than 256 bits. If HPSZ is less than 256 bits, then HPC is set to 1 and 32 bytes of HP are written (1210). The path through blocks 1202, 1204, 1206, and 1210, forms a short path, and leads to fast write accesses for high priority cache lines. If HPSZ is not less than 256 bits, then a CL is read (1208). Then it is determined (1212) if HPSZ is less than 511−LPE. If it is, then CL is updated (1214) with HP and HPC is set to 1, and the CL is written (1216). If HPSZ is not less than 511−LPE, then it is further determined (1218) if OFP is set (or it is checked if the CL has an OFP). If there is an OFP, then the OFP is read (1220). If there is no OFP, then LP contents are read and OFP is freed (1222). Furthermore, it is determined (1224) if HP is compressible (1224). If HP is compressible, then new OFP block with bit size greater than LPSZ−(480−HPSZ) is obtained (1232), new OFP with LP is updated (1234), and CL is filled with HP and HPC is set to 1 (1236). If HP is not compressible, then new OFP block with bit size greater than LPSZ+32 is obtained (1226), 32 bits of HP overflow are copied and new OFP is updated with LP (1228), and CL is filled with HP and HPC is set to 0 (1230). Subsequently, OFP is written (1238) and CL is written (1240).

Figure 13:
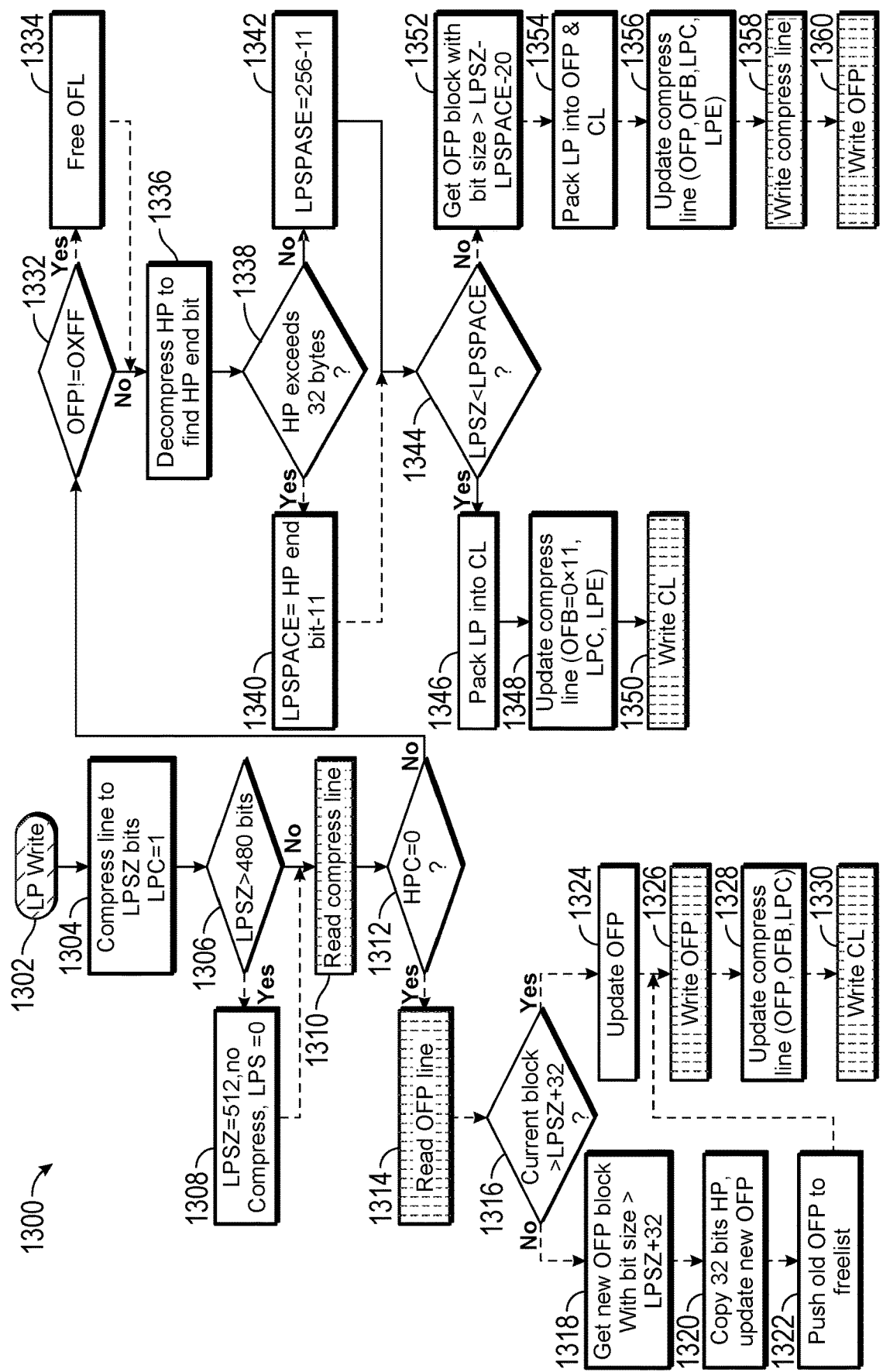
FIG. 13 shows a flowchart for an example method for writing low priority cache lines, according to some implementations.

FIG. 13 shows a flowchart for an example method 1300 for writing low priority cache lines, according to some implementations. The method 1300 includes receiving (1302) a LP write request and compressing line to LPSZ bits and setting LPC to 1 (1304). The method also includes determining (1306) if LPSZ is greater than 480 bits. If LPSZ is greater than 480 bits, then LPSZ is set to 512 (to indicate no compression) and LPS is set to 0 (1308). If LPSZ is not greater than 480 bits, compress line is read (1310). It is further determined (1312) if HPC is set to 0. If HPC is set to 0, then OFP line is read (1314). It is further determined if current block is greater than LPSZ plus 32. If it is, then OFP is updated (1324). If current block is not greater than LPSZ plus 32, the new OFP block with bit size greater than LPSZ+32 is obtained (1318), 32 bits of HP is copied and new OFP is updated (1320), and old OFP is pushed to a free list (1322). Subsequently, OFP is written (1326), compress line is updated (1328) for OFP, OFB, and LPC, and CL is written (1330). If HPC is not equal to 0 (block 1312), then it is further determined (1332) if OFP is not set to 0×FF. If it is not, then OFL is freed (1334). If OFP is set to 0×FF, HP is decompressed (1336) to find HP end bit. It is further determined (1338) if HP exceeds 32 bytes. If it is LPSPACE is set to HP end bit−11. If not, LPSPACE is set to 256−11. In either case, it is further determined (1344) if LPSZ is less than LPSPACE. If so, LP is packed (1346) into CL, compress line is updated (1348) for (OFP set to 0×11, LPC, and LPE), and CL is written (1350). If LPSZ is not less than LPSPACE, an OFP block with bit size greater than LPSZ−LPSPACE−20, is obtained (1352), LP is packed (1354) into OFP and CL, CL is updated (1356) for (OFP, OFB, LPC, and LPE), CL is written (1358), and OFP is written (1360).

Figure 14:
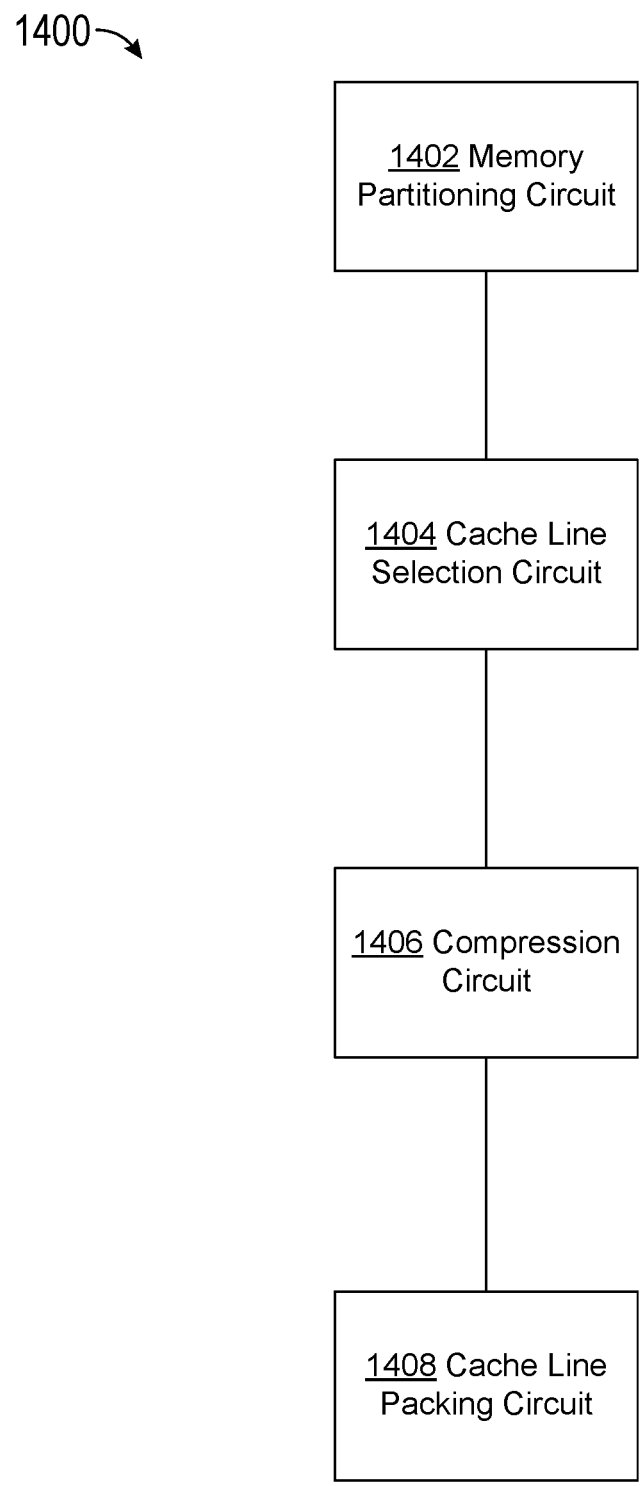
FIG. 14 is a block diagram of an example compressed memory system of a processor-based system, according to some implementations.

FIG. 14 is a block diagram of an example compressed memory system 1400 of a processor-based system, according to some implementations. The system 1400 includes a memory partitioning circuit 1402 configured to partition a memory region into a plurality of data regions. Each data region is associated with a respective priority level. Memory regions include compression data candidates and may include data and/or instructions. For example, a software image can be linked with different sections. Each section can have a different address range. The memory partitioning circuit 1402 may be configured to distinguish different data regions based on address range. In FIG. 3, a memory region is shown partitioned into a high-priority aperture 302 and a low-priority aperture 304, according to some implementations. Although only two apertures or priority levels are shown in FIG. 3, more than two apertures (sometimes called data regions) and/or more than two priority levels may be used in some implementations.

The compressed memory system 1400 also includes a cache line selection circuit 1404 configured to select (i) a first cache line from a first data region of the plurality of data regions and (ii) a second cache line from a second data region of the plurality of data regions. For example, a cache line's address may be used by the cache line selection circuit 1404 to determine whether the cache line belongs to a first data region or a second data region. In accordance with that determination, the cache line selection circuit 1404 may select the first cache line and the second cache line. The first data region has a higher priority level than the second data region. For example, in FIG. 3, a cache line from the high-priority aperture 302 and a cache line from the low-priority aperture 304 are selected to form a compressed cache line 306.

The compressed memory system 1400 also includes a compression circuit 1406 configured to compress (i) the first cache line to obtain a first compressed cache line and (ii) the second cache line to obtain a second compressed cache line. Examples of compression circuits are described above in reference to FIGS. 1, 2A, 2B and 2C, according to some implementations.

The compressed memory system 1400 also includes a cache line packing circuit 1408 configured to: in accordance with a determination that the first cache line is compressible, write (i) the first compressed cache line to a first predetermined portion of a candidate compressed cache line, and (ii) either the second cache line or a second portion of the second compressed cache line to a second predetermined portion of the candidate compressed cache line. The first predetermined portion is larger than the second predetermined portion. For example, FIG. 5 shows a high-priority cache line that is compressed and written to HP 402 which indicates a first predetermined portion. FIG. 5 also shows a low-priority cache line that is compressed and written to LP 404, a second predetermined portion. In some implementations, the first and second predetermined portions can correspond to two distinct portions of a compressed cache line. The first predetermined portion is filled first with high priority compressed data, and the second predetermined portion can be filled next with low priority data. High priority data can overflow into the second predetermined portion, but the low priority data cannot overflow into the first predetermined portion. In some implementations, the second predetermined portion includes control bits and the first predetermined portion does not. In some implementations, the compressed data is written in different directions (e.g., towards the intersection of the two portions).

In some implementations, the cache line packing circuit 1408 is further configured to: in accordance with a determination that (i) the first cache line is not compressible, (ii) the second cache line is not compressible, or (iii) the second compressed cache line does not fit within the second predetermined portion of the candidate compressed cache line: set an overflow pointer (e.g., the OFP 412 in FIG. 4) in the candidate compressed cache line. The overflow pointer points to one of a plurality of overflow blocks (e.g., one of the overflow bins 308, 310, or 312) depending on compressibility of the second cache line or a size of the second compressed cache line. Each overflow block of the plurality of overflow blocks is of a different size. For example, the overflow bins 308, 310, and 312 hold different sizes of data. In some implementations, the cache line packing circuit 1408 is further configured to: receive a read request for the first cache line or the second cache line; and in response to receiving the read request: in accordance with a determination that the overflow pointer is set, retrieve data from an overflow block of the plurality of overflow blocks according to the overflow pointer. Examples of overflow blocks and overflow logic are described above in reference to FIGS. 3, 4, 7, 8, and 9, according to some implementations. Example methods for reading are described above in reference to FIGS. 10 and 11, according to some implementations.

In some implementations, the cache line packing circuit 1408 is further configured to: in accordance with a determination that the first cache line is compressible, set a first compressibility control bit (e.g., HPC 406) in the candidate compressed cache line; and in accordance with a determination that the first cache line is not compressible: write a first portion of the first cache line to the candidate compressed cache line; write a remaining portion of the first cache line to an overflow block; reset the first compressibility control bit in the candidate compressed cache line; and set an overflow pointer in the candidate compressed cache line to point to the overflow block. An example is described above in reference to FIG. 9, according to some implementations. In some implementations, the cache line packing circuit 1408 is further configured to: in response to receiving a read request for the first cache line: in accordance with a determination that the first compressibility control bit is set: retrieve the first cache line from the candidate compressed cache line; and in accordance with a determination that the first compressibility control bit is reset: retrieve the first portion of the first cache line from the candidate compressed cache line; and retrieve the second portion of the first cache line from the overflow block based on the overflow pointer. In some implementations, the cache line packing circuit 1408 is further configured to: in accordance with a determination that the first cache line is not compressible: write either the second cache line or the second compressed cache line to the overflow block depending on whether the second cache line is compressible; and reset a second compressibility control bit (e.g., LPC 408) in the candidate compressed cache line to indicate if the second cache line is not compressible. In some implementations, the cache line packing circuit 1408 is further configured to: in response to receiving a read request for the second cache line: retrieve either the second cache line or the second compressed cache line from the overflow block, based on the second compressibility control bit. Example methods for reading high priority cache lines and low priority cache lines are described above in reference to FIGS. 10 and 11, respectively, according to some implementations.

In some implementations, the cache line packing circuit 1408 is further configured to: in response to receiving a cache line write request for the first cache line: compress the first cache line (e.g., using the compression circuit 1406) to obtain a first updated cache line of a first size; in accordance with a determination that the first size is equal to or less than a first predetermined size of the candidate compressed cache line, write the first updated cache line to the candidate compressed cache line; in accordance with a determination that the first size is more than the first predetermined size and equal to or less than a second predetermined size of the candidate compressed cache line, perform a read-modify-write operation on the candidate compressed cache line based on the first updated cache line; and in accordance with a determination that the first size is more than the second predetermined size of the candidate compressed cache line, perform a read-modify-write operation on the candidate compressed cache line and a read-modify-write operation on an overflow block of the plurality of overflow blocks, based on the first updated cache line. In some implementations, the first predetermined size is a half of size of the candidate compressed cache line. In some implementations, the cache line packing circuit 1408 is further configured to: while writing either the second cache line or the second portion of the second compressed cache line to the second predetermined portion of the candidate compressed cache line, write an ending bit index (e.g., LPE 414) in the candidate compressed cache line to indicate where the second cache line or the second portion of the second compressed cache line was written to within the candidate compressed cache line; and compute the second predetermined size based on the ending bit index in the candidate compressed cache line.

In some implementations, the cache line packing circuit 1408 is further configured to: in response to receiving a cache line write request for the second cache line: compress the second cache line to obtain a second updated cache line of a second size; in accordance with a determination that a sum of the second size and the size of the first compressed cache line is less than a first predetermined size of the candidate compressed cache line, perform a read-modify-write operation to write the second updated cache line to the candidate compressed cache line; and in accordance with a determination that the sum of the second size and the size of the first compressed cache line is not less than the first predetermined size of the candidate compressed cache line, perform (i) a first read-modify-write operation to write a first portion of the second updated cache line to the candidate compressed cache line, and (ii) a second read-modify-write operation to write a remaining portion of the second updated cache line to the overflow block pointed to by the overflow pointer. For high-priority cache lines, in some implementations, there are no control bits to indicate where HP ends. In such instances, the system decompresses the HP part to determine that information. In some implementations, this is not a true decompression, rather it is a scan through the HP compressed bits (the process is very similar to decompression) to determine the end. Some implementations reserve 8-9 bits to indicate the end of HP just like the LP side.

In some implementations, the cache line packing circuit 1408 is further configured to: in response to receiving a cache line write request for the first cache line or the second cache line: compress the first cache line or the second cache line to obtain an updated compressed cache line of an updated size; and in accordance with a determination that the updated size cannot fit within the overflow block pointed to by the overflow pointer, free the overflow pointer and updating the overflow pointer to point to a new overflow block of the plurality of overflow blocks. Examples for manipulation of free lists are described above in reference to FIGS. 12 and 13, according to some implementations.

In some implementations, the first compressed cache line, the second compressed cache line, and the candidate compressed cache line are of equal size. For example, in FIG. 3, each cache line from the region 302, 304, and the compressed cache lines 306 are of 64 bytes.

In some implementations, the first data region and the second data region are of equal size. For example, in FIG. 3, the regions 302 and 304 are of equal size (e.g., the regions have equal number of cache lines).

In some implementations, the second predetermined portion is less than half the size of the candidate compressed cache line. Examples of layouts are described above in reference to FIGS. 4-9, according to some implementations.

In some implementations, the cache line packing circuit 1408 is further configured to: write the first compressed cache line and the second compressed cache line to the candidate compressed cache line in opposite directions. The first compressed cache line and the second compressed cache line are separated by one or more bytes.

In another aspect, a compressed memory system of a processor-based system is provided. The compressed memory system includes a memory region comprising a plurality of cache lines. For example, FIG. 3 shows two memory regions 302 and 304. Each cache line has one of a plurality of priority levels. For example, the cache lines in the region 302 are of a higher priority than the cache lines in the region 304. The compressed memory system also includes a compressed memory region (e.g., region including the compressed cache lines 306) comprising a plurality of compressed cache lines. Each compressed cache line includes a first set of data bits configured to hold, in a first direction, either a portion of a first cache line or a portion of the first cache line after compression, the first cache line having a first priority level. For example, the layout shown in FIG. 4 shows a compressed cache line including HP 402 for storing bits of a high priority cache line, according to some implementations. Each compressed cache line also includes a second set of data bits configured to hold, in a second direction opposite to the first direction, either a portion of a second cache line or a portion of the second cache line after compression, the second cache line having a second priority level lower than the first priority level. For example, the layout shown in FIG. 4 shows a compressed cache line including LP 404 for storing bits for a low priority cache line, according to some implementations. The first set of data bits includes a greater number of bits than the second set of data bits. HP 402 stores compressed bits in a direction opposite to that of LP 404. The layout in FIG. 4 shows that bits for a high priority cache line can occupy HP 402 and region 420, whereas bits for a low priority cache line can occupy only LP 404, smaller in size than HP 402.

In some implementations, the compressed memory system further includes an overflow memory region including a plurality of overflow bins (e.g., the overflow block 426). Each overflow bin is configured to hold a distinct number of bytes. For example, the overflow blocks 308, 310, and 312, each include different number of bytes. Each compressed cache line further includes a set of overflow pointer bits (e.g., OFP 412) configured to hold a pointer to an overflow bin of the plurality of overflow bins.

In some implementations, each compressed cache line further includes: a first control bit (e.g., HPC 406) to indicate a compressibility of the first cache line; and a second control bit (e.g., LPC 408) to indicate a compressibility of the second cache line.

In some implementations, the compressed memory system further includes an overflow memory region including a plurality of overflow bins. Each overflow bin is configured to hold a distinct number of bytes. Each compressed cache line further includes a set of bits (e.g., OFB 410) configured to hold a size of an overflow bin of the plurality of overflow bins.

In some implementations, each compressed cache line further includes an ending bit index (e.g., LPE 414) indicating an end of the second set of data bits.

In some implementations, each overflow bin is configured to hold bits of the first cache line, and/or bits of the second cache line or the second cache line after compression, in the first direction. For example, as shown in FIG. 4, the overflow bin 420 holds bits in the same direction as HP 402.

In some implementations, the first set of data bits is separated by one or more bytes from the second set of data bits. For example, in FIG. 4, HP 402 and LP 404 are separated by the gap 422.

In some implementations, each cache line and each compressed cache line are of a same size. For example, in FIG. 3, each cache line 302 and 304, each compressed cache line 306 includes 64 bytes.

In some implementations, when the first cache line after compression or the second cache line after compression does not fit in the compressed cache line then each compressed cache line further includes a set of overflow pointer bits configured to hold a pointer to an overflow bin of the plurality of overflow bins. The overflow bin is configured to hold bits of the first cache line, the first cache line after compression, the second cache line, and/or the second cache line after compression. In other words, as shown in FIGS. 5 and 6, the OFP 412 is optional, and used only when there is an overflow. When both cache lines after compression fit in the compressed cache line, the OFP bits are not used.

In some implementations, the second set of data bits is further configured to hold a plurality of control bits that indicate overflow (e.g., OFP 412, OFB 410) and an end of the second set of data bits (e.g., LPE 414) in a compressed cache line.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A compressed memory system of a processor-based system, comprising:
  a memory region comprising a plurality of cache lines, wherein each cache line has one of a plurality of priority levels;
  a compressed memory region comprising a plurality of compressed cache lines, wherein each compressed cache line includes:
    a first set of data bits configured to hold, in a first direction, either a portion of a first cache line or a portion of the first cache line after compression, the first cache line having a first priority level; and
    a second set of data bits configured to hold, in a second direction opposite to the first direction, either a portion of a second cache line or a portion of the second cache line after compression, the second cache line having a second priority level lower than the first priority level, wherein the first set of data bits includes a greater number of bits than the second set of data bits.

2. The compressed memory system of claim 1, further comprising:
an overflow memory region including a plurality of overflow bins, wherein each overflow bin is configured to hold a distinct number of bytes;
wherein each compressed cache line further includes:
a set of overflow pointer bits configured to hold a pointer to an overflow bin of the plurality of overflow bins.

3. The compressed memory system of claim 2, wherein each overflow bin is configured to hold bits of the first cache line, and/or bits of the second cache line or the second cache line after compression, in the first direction.

4. The compressed memory system of claim 1, wherein each compressed cache line further includes:
a first control bit to indicate a compressibility of the first cache line; and
a second control bit to indicate a compressibility of the second cache line.

5. The compressed memory system of claim 1, further comprising:
an overflow memory region including a plurality of overflow bins, wherein each overflow bin is configured to hold a distinct number of bytes;
wherein each compressed cache line further includes:
a set of bits configured to hold a size of an overflow bin of the plurality of overflow bins.

6. The compressed memory system of claim 1, wherein each compressed cache line further includes an ending bit index indicating an end of the second set of data bits.

7. The compressed memory system of claim 1, wherein the first set of data bits is separated by one or more bytes from the second set of data bits.

8. The compressed memory system of claim 1, wherein each cache line and each compressed cache line are of a same size.

9. The compressed memory system of claim 1, wherein when the first cache line after compression or the second cache line after compression does not fit in the compressed cache line then each compressed cache line further includes a set of overflow pointer bits configured to hold a pointer to an overflow bin of the plurality of overflow bins, and wherein the overflow bin is configured to hold bits of the first cache line, the first cache line after compression, the second cache line, and/or the second cache line after compression.

10. The compressed memory system of claim 1, wherein the second set of data bits is further configured to hold a plurality of control bits that indicate overflow and an end of the second set of data bits in a compressed cache line.

* * * * *